United States Patent [19]
Ehlenbeck

[11] 3,917,423
[45] Nov. 4, 1975

[54] PIPE CLAMP FOR RESISTING ROTATIONAL FORCES

[76] Inventor: Gary J. Ehlenbeck, 4782 N. Woodruff Ave., Whitefish Bay, Wis. 53217

[22] Filed: July 25, 1974

[21] Appl. No.: 491,732

[52] U.S. Cl. ............... 403/204; 403/406; 403/356; 403/281
[51] Int. Cl.² ... F16D 1/00; F16D 3/00; E21B 19/16
[58] Field of Search ........... 403/189, 204, 217, 300, 403/314, 356, 362, 373, 374, 375, 281, 284, 403/274, 109, 110, 346, 347, 382, 406

[56] References Cited
UNITED STATES PATENTS

| 597,329 | 1/1898 | Rylander | 403/300 |
| 2,630,835 | 3/1953 | Russell | 403/362 X |
| 3,100,662 | 8/1963 | Howard | 403/356 X |
| 3,603,624 | 9/1971 | Attermeyer | 403/300 |

FOREIGN PATENTS OR APPLICATIONS

| 1,373,288 | 8/1964 | France | 403/300 |
| 91,660 | 11/1966 | France | 403/110 |

Primary Examiner—Werner H. Schroeder
Assistant Examiner—Wayne L. Shedd
Attorney, Agent, or Firm—Andrus, Sceales, Starke & Sawall

[57] ABSTRACT

A device suitable for clamping a pipe has a tubular collar for receiving the pipe. A clamping member mounted in a slot in the collar engages the pipe. Bolts fastened to the collar at either end of the slot extend through washers on the clamping member and nuts on the bolts draw the clamping member into engagement with the pipe.

4 Claims, 4 Drawing Figures

PIPE CLAMP FOR RESISTING ROTATIONAL FORCES

SUMMARY

Metal pipe forms a common structural element since it combines desirable columnar and flexural strengths with light weight, low cost and wide availability. However, the tubular nature of pipe often renders it difficult to join other elements to the pipe, on either a temporary or permanent basis. Joinder which resists rotational forces is particularly difficult. While piercing the pipe may provide such joinder, special tools or guides may be required. Drilling the pipe also reduces its strength or other structural properties.

As a result of the foregoing, various types of clamps have been utilized in the past to grip the pipe without piercing it. The other structural elements are then secured to the clamp. Typically, such clamps employ set screws to grip the pipe. When used in load bearing structures subjected to rotational loading, set screws, with their limited contact area against the pipe, frequently produce a cutting action on the outer wall of the pipe. This often requires a higher quality pipe to secure satisfactory attachment and leaves much to be desired in terms of holding strength under various types of loads, resistance to vibration and deterioration, and other factors.

It is, therefore, the object of the present invention to provide an improved pipe clamp suitable for permanent or temporary affixation to the exterior of a pipe and capable of resisting rotational forces. The clamp provides a means by which other structural elements may be attached to the pipe. The salient feature of the invention is the exceedingly high strength by which the device grips the pipe. The pipe clamp of the invention exhibits a high resistance to vibration and deterioration. The invention is thus suitable for use in load bearing structures.

The device is simple and economical in construction and manufacture and is easy and rapid to apply, release, or adjust.

DESCRIPTION OF THE PREFERRED EMBODIMENT

Figure 1:
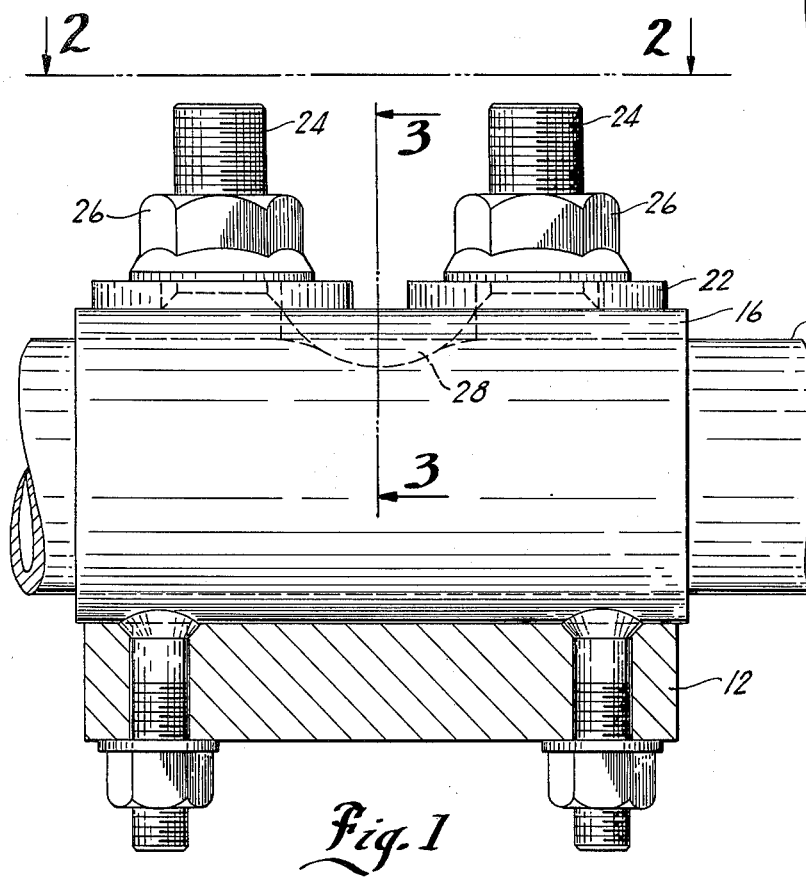
FIG. 1 is a side view of one embodiment of the improved pipe clamp of the present invention.

Turning now to the Figures, there is shown in FIG. 1, the device 10 of the present invention. While the device of the present invention has numerous uses, it is shown in FIG. 1 as a means for joining wooden stringer 12 to pipe 14 in a manner which prevents relative rotation between the two elements.

Device 10 includes tubular collar 16 which surrounds pipe 14. The clearance between collar 16 and pipe 14 depends on the particular application of the pipe clamp and on the dimensions of the commercially available plumbing pipe sizes from which collar 16 and pipe 14 are frequently formed. The clearance varies with pipe size and manufacturing tolerances and is typically a radial clearance of one thirty-second inch on the smaller pipe sizes through three-sixteenths inch on the larger pipe sizes.

Figure 2:
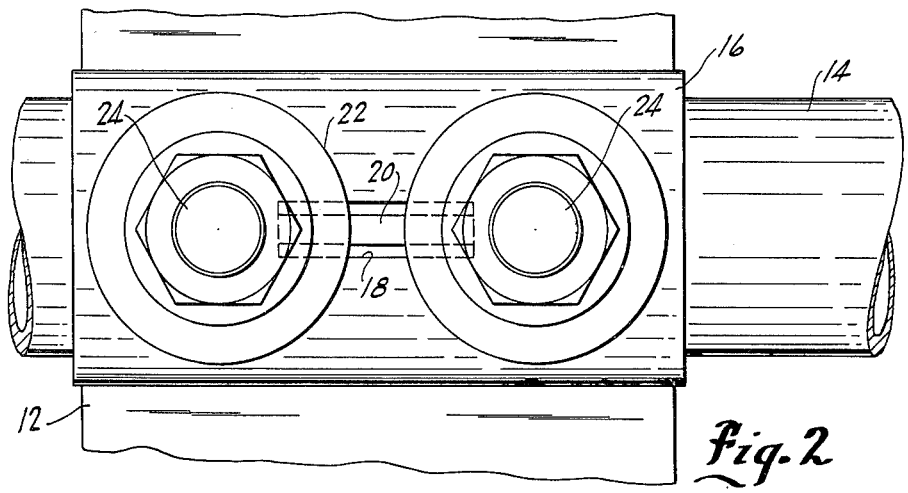
FIG. 2 is a top view taken along line 2—2 of FIG. 1.
Figure 4:
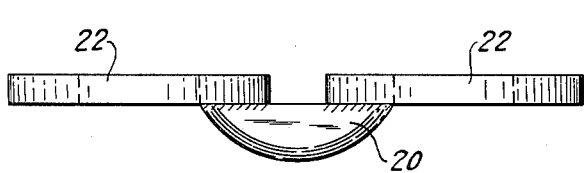
FIG. 4 is a side view of the clamping member of the improved pipe clamp of the present invention.
Figure 3:
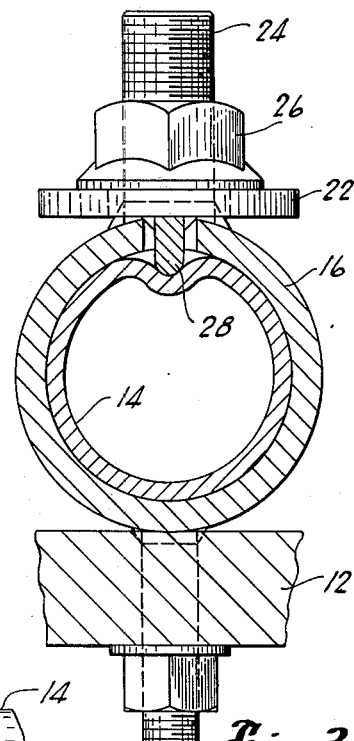
FIG. 3 is a cross sectional view taken along line 3—3 of FIG. 1.

Collar 16 has an elongated slot 18 therein lying parallel to the axis of the collar. See FIG. 2. An arcuate projection 20 extends through slot 18 for engaging pipe 14. See FIGS. 1 and 3. Projection 20 is preferably sized so as to have a depth approximately ¼ inch greater than the thickness of collar 16 plus the clearance between pipe 14 and collar 16. A washer 22 is fastened, as by welding, to either end of arcuate projection 20. Bolts 24 are stud welded to collar 16 adjacent to the ends of slot 18 to extend through washers 22. Flange nuts 26 are threaded on bolts 24 over washers 22.

To clamp device 10 on pipe 14, collar 16 is located at the desired position on the pipe. Washers 22 are placed over bolts 24 and projection 20 lowered into slot 18. Nuts 26 are threaded on bolts 24. One of the nuts 26 is tightened to lower one of the washers. This rocks projection 20 by virtue of its arcuate shape raising the other end of the projection and the other washer 22. The other nut 26 is then tightened to cam projection 20 into pipe 14 with a crushing action which forms the groove 28 in pipe 14 shown in FIGS. 1 and 3. The groove so created prevents movement of collar 16 along pipe 14, and particularly prevents rotary movement of collar 16 about pipe 14.

Various modes of carrying out the invention are contemplated as being within the scope of the following claims particularly pointing out and distinctly claiming the subject matter which is regarded as the invention.

I claim:

1. A device affixable to the exterior surface of a pipe comprising:

a tubular collar suitable for internally receiving the pipe in close proximity thereto, said collar having a medial elongated slot aligned with the axis of said collar;

a clamping member having an arcuate projection adapted to extend through said slot, said projection having a convex surface for engaging said pipe;

radially extending bolts mounted on said collar adjacent either end of said slot;

means on said clamping member coupling said arcuate projection to said bolts; and nuts radially movable along said bolts into engagement with said coupling means to move said convex surface into engagement with the pipe.

2. The device according to claim 1 wherein said coupling means comprises washers joined to said arcuate projection and surrounding said bolts.

3. The device according to claim 2 wherein said nuts include flanges abutting said washers.

4. The device according to claim 1 wherein said collar contains means for joining other structural elements thereto.

* * * * *